(12) United States Patent
Zhang et al.

(10) Patent No.: US 7,429,853 B2
(45) Date of Patent: Sep. 30, 2008

(54) SERIES RESONANT CIRCUIT AND VOLTAGE STABILIZING METHOD THEREOF

(75) Inventors: Qing-You Zhang, Taoyuan Shien (TW); Guo-Dong Yin, Taoyuan Shien (TW); Zhi-Ying Chen, Taoyuan Shien (TW); Jun-Feng Guan, Taoyuan Shien (TW); Jian-Ping Ying, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 461 days.

(21) Appl. No.: 11/358,651

(22) Filed: Feb. 21, 2006

(65) Prior Publication Data
US 2006/0186829 A1 Aug. 24, 2006

(30) Foreign Application Priority Data
Feb. 21, 2005 (TW) .............................. 94105121 A

(51) Int. Cl.
*G05F 3/04* (2006.01)
*H01F 17/00* (2006.01)

(52) U.S. Cl. ....................................... 323/305; 323/363

(58) Field of Classification Search ................. 323/232, 323/304, 305, 355, 363; 363/16, 17, 21.01, 363/21.02, 131, 132
See application file for complete search history.

(56) References Cited

U.S. PATENT DOCUMENTS

| 4,916,380 A | * | 4/1990 | Burroughs | ................... 323/282 |
| 5,434,767 A | * | 7/1995 | Batarseh et al. | ............... 363/16 |
| 5,570,006 A | * | 10/1996 | Woodworth | ................. 323/208 |
| 6,418,038 B2 | * | 7/2002 | Takahama et al. | .............. 363/17 |

* cited by examiner

*Primary Examiner*—Thuy Vinh Tran
(74) *Attorney, Agent, or Firm*—Volpe And Koenig, P.C.

(57) ABSTRACT

A series resonant circuit device and a voltage stabilizing method thereof are provided. The series resonant circuit device includes a resonant circuit having at least a resonant capacitor and a resonant inductor, an equivalent capacitor electrically coupled to the resonant circuit, a magnetizing inductor electrically connected to the equivalent capacitor in parallel, a transformer having a primary winding electrically connected to the magnetizing inductor in parallel, and a current impulse circuit electrically coupled to the resonant circuit and synchronized with an input voltage of the series resonant circuit device. The voltage stabilizing method is to provide a current impulse to the equivalent capacitor so as to decrease a current difference between the resonant inductor and the magnetizing inductor when the input voltage varies.

20 Claims, 10 Drawing Sheets

SERIES RESONANT CIRCUIT AND VOLTAGE STABILIZING METHOD THEREOF

FIELD OF THE INVENTION

The present invention relates to a series resonant circuit and a voltage stabilizing method for the series resonant circuit device with zero load, and more particularly to a series resonant circuit for a power supply.

BACKGROUND OF THE INVENTION

A series resonant circuit is often applied to a power supply. Please refer to FIG. 1(a), which is a circuit diagram showing a conventional series resonant circuit according to the prior art. In FIG. 1(a), the conventional series resonant circuit includes an input voltage generating circuit, a resonant capacitor Cr, a resonant inductor Lr, an equivalent capacitor Cs, a magnetizing inductor Lm, a transformer Tl, an output rectifier circuit, and an output capacitor Co. The capacitance of the equivalent capacitor Cs is one from the capacitance of a junction capacitor of a rectifier semiconductor in an output terminal of the series resonant circuit and the capacitance of a parasitic capacitor of the transformer Tl which are converted to the primary winding Np of the transformer Tl. An input voltage is generated by the input voltage generating circuit and then frequency-converted by the series resonant circuit, and an output voltage is finally obtained in the output terminal.

The drawback of the conventional series resonant circuit shown in FIG. 1(a) is that a wide range of the operation frequency for the series resonant circuit is needed in order to modulate the output voltage within a wider range of the load variation. However, the highest output frequency of the control chip is limited, and an unpleasant drifted output voltage resulting from the fixed operation frequency of the series resonant circuit with no load may occur.

FIG. 1(b) is a circuit diagram showing two series resonant circuits connected in parallel according to the prior art. FIG. 1(c) is a circuit diagram showing several series resonant circuits connected in parallel according to the prior art. They both have the drawback of the unpleasant drifted output voltage.

To avoid the drawback, a widely-adopted solution is to couple a dummy load, e.g. the dummy load $R_{dummy}$ shown in FIGS. 1(a)~1(c), to the output terminal of the series resonant circuit.

In FIG. 1(a), for example, the equivalent capacitor Cs will be charged or discharged by a current when the potential of the input voltage generating circuit varies. The current for charging and discharging the equivalent capacitor Cs must pass through the resonant inductor Lr, so a current difference is generated between the current through the resonant inductor Lr and the current through the magnetizing inductor Lm. After the charging and discharging procedure is finished, the current difference between the current through the resonant inductor Lr and the current through the magnetizing inductor Lm will be transferred from the primary winding Np to the secondary winding Ns and then appear at the load in the output terminal.

To avoid the unpleasant drifted output voltage of the series resonant circuit with no load, the power consumed by the dummy load $R_{dummy}$ at each operation frequency must be equal to that transferred from the primary winding Np to the secondary winding Ns. Unfortunately, an unbearable high no-load loss is hence obtained.

SUMMARY OF THE INVENTION

It is therefore an aspect of the present invention to provide a series resonant circuit and a voltage stabilizing method for the series resonant circuit device with zero load.

It is therefore another aspect of the present invention to provide a series resonant circuit and the control method thereof. Under the situation of no dummy load, the series resonant circuit is able to operate smoothly with no load. Even if the variation of the operation frequency is narrower, a better operation efficiency of the series resonant circuit is obtained within the range of the load variation.

According to the foregoing aspects of the present invention, a series resonant circuit device is provided. The series resonant circuit device includes a resonant circuit having at least a resonant capacitor and a resonant inductor, an equivalent capacitor electrically coupled to the resonant circuit, a magnetizing inductor electrically connected to the equivalent capacitor in parallel, a transformer having a primary winding electrically connected to the magnetizing inductor in parallel, and a current impulse circuit electrically coupled to the resonant circuit and synchronized with an input voltage of the series resonant circuit device for providing a current impulse to the equivalent capacitor so as to decrease a current difference between the resonant inductor and the magnetizing inductor when the input voltage varies.

According to the foregoing aspects of the present invention, a voltage stabilizing method for a series resonant circuit device with zero load is provided. The series resonant circuit device includes a resonant circuit, a equivalent capacitor, a magnetizing inductor and a transformer. The resonant circuit has at least a resonant capacitor and a resonant inductor. The equivalent capacitor and the magnetizing inductor are electrically connected in parallel and then electrically coupled to the resonant circuit. A primary winding of the transformer is electrically connected to the magnetizing inductor in parallel. The voltage stabilizing method includes steps of providing an input voltage to the series resonant circuit device and providing a current impulse to the equivalent capacitor so as to decrease a current difference between the resonant inductor and the magnetizing inductor when the input voltage varies.

According to the foregoing aspects of the present invention, another voltage stabilizing method for a series resonant circuit device with zero load is provided. The series resonant circuit device includes a resonant circuit, at least two equivalent capacitors, at least two magnetizing inductors and at least two transformers. The resonant circuit has at least a resonant capacitor and a resonant inductor. All the equivalent capacitors and the magnetizing inductors are electrically connected in parallel and then electrically coupled to the resonant circuit. A primary winding of each of the transformers is electrically connected to each of the magnetizing inductors in parallel. The voltage stabilizing method includes steps of providing an input voltage to the series resonant circuit device and providing a current impulse to each of the equivalent capacitors so as to decrease a respective current difference between the resonant inductor and each of the magnetizing inductors when the input voltage varies.

According to the foregoing aspects of the present invention, a further voltage stabilizing method for a series resonant circuit device with zero load is provided. The series resonant circuit device includes a resonant circuit, a equivalent capacitor, a magnetizing inductor and a transformer. The resonant circuit has at least a resonant capacitor and a resonant inductor. The equivalent capacitor and the magnetizing inductor are electrically connected in parallel and then electrically coupled to the resonant circuit. A primary winding of the transformer is electrically connected to the magnetizing inductor in parallel. The voltage stabilizing method includes steps of providing an input voltage to the series resonant circuit device and charging and discharging the equivalent capacitor so as to decrease a current difference between the resonant inductor and the magnetizing inductor when the input voltage varies.

According to the foregoing aspects of the present invention, a further another voltage stabilizing method for a series resonant circuit device with zero load is provided. The series resonant circuit device includes a resonant circuit, at least two equivalent capacitors, at least two magnetizing inductors and at least two transformers. The resonant circuit has at least a resonant capacitor and a resonant inductor. All the equivalent capacitors and the magnetizing inductors are electrically connected in parallel and then electrically coupled to the resonant circuit. A primary winding of each of the transformers is electrically connected to each of the magnetizing inductors in parallel. The voltage stabilizing method includes steps of providing an input voltage to the series resonant circuit device and charging and discharging each of the equivalent capacitors so as to decrease a current difference between the resonant inductor and each of the magnetizing inductors when the input voltage varies.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The object of the present invention is to stabilize the output voltage of a series resonant circuit with no load under the situation of no dummy load.

Figure 1A:
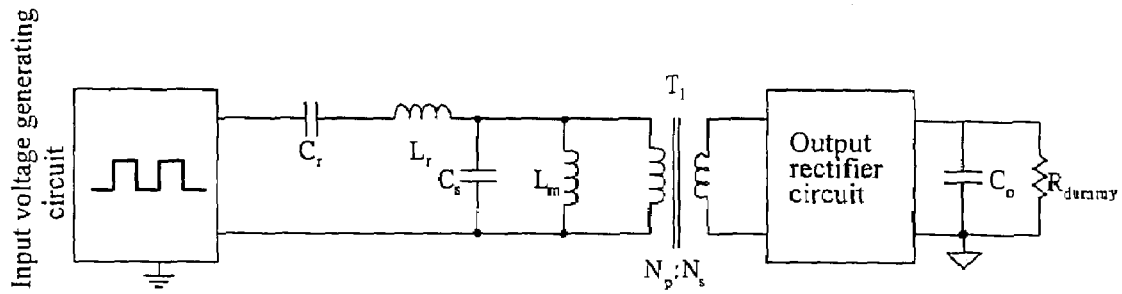
FIG. 1(a) is a circuit diagram showing a conventional series resonant circuit according to the prior art.
Figure 1B:
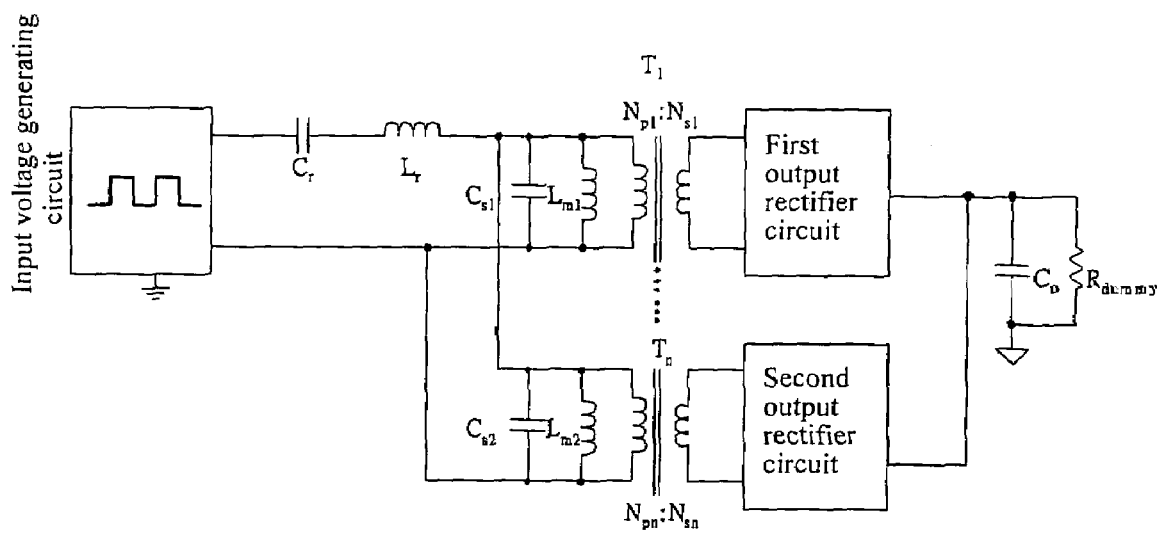
FIG. 1(b) is a circuit diagram showing two series resonant circuits connected in parallel according to the prior art.
Figure 1C:
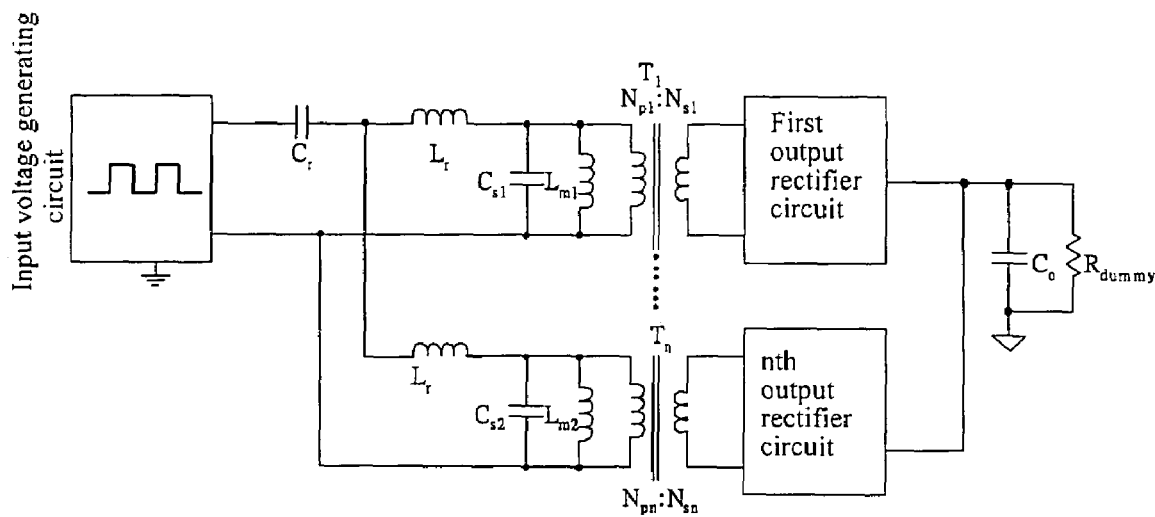
FIG. 1(c) is a circuit diagram showing several series resonant circuits connected in parallel according to the prior art.
Figure 2A:
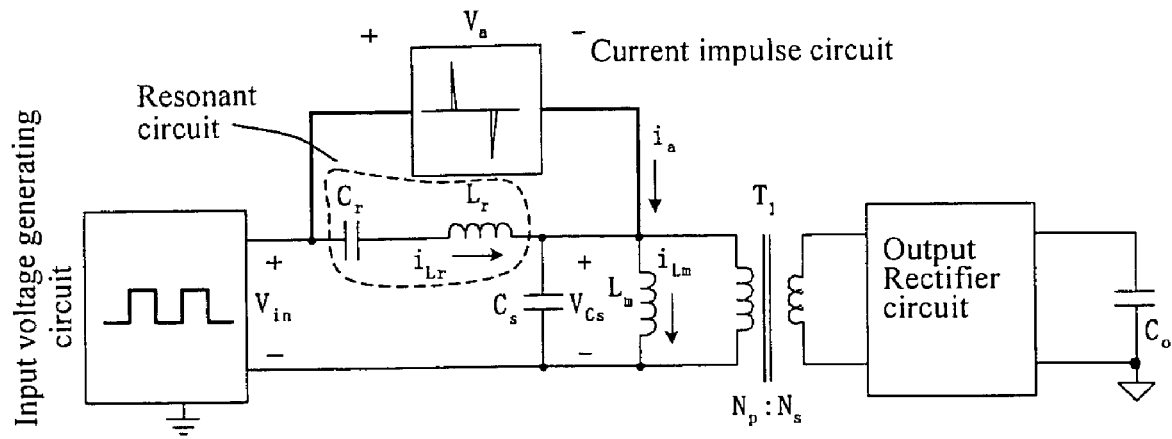
FIGS. 2(a) & 2(b) are circuit diagrams showing a series resonant circuit according to the first embodiment of the present invention.

Please refer to FIG. 2(a), which is a circuit diagram showing a series resonant circuit according to the first embodiment of the present invention. As FIG. 2(a) shows, the series resonant circuit includes a resonant circuit composed of at least a resonant capacitor Cr and a resonant inductor Lr, an equivalent capacitor Cs, a magnetizing inductor Lm, a transformer T1 and a current impulse circuit.

In FIG. 2(a), the resonant capacitor Cr is for receiving an input voltage Vin from an input voltage generating circuit. The resonant inductor Lr is electrically connected to the resonant capacitor Cr in parallel. The equivalent capacitor Cs is electrically connected to the resonant inductor Lr in series. The capacitance of the equivalent capacitor Cs is one from the capacitance of a junction capacitor in an output terminal of the series resonant circuit and the capacitance of a parasitic capacitor of the transformer T1 which are converted to a primary winding Np of the transformer T1. The magnetizing inductor Lm is electrically connected to the equivalent capacitor Cs in parallel. The primary winding Np of the transformer T1 is electrically connected to the magnetizing inductor Lm in parallel. The transformer T1 is for providing an output voltage to a rectifier circuit. One terminal of the current impulse circuit is electrically connected to the resonant capacitor Cr and the input voltage Vin, and the other terminal of the current impulse circuit is electrically connected to the transformer T1. The current impulse circuit is for providing a current impulse.

In the aforementioned conventional series resonant circuit, the equivalent capacitor Cs will be charged or discharged when the input voltage Vin varies. At this time, a current difference occurs between the current $i_{Lr}$ through the resonant inductor Lr and the current $i_{Lm}$ through the magnetizing inductor Lm. The current difference will be transferred from the primary winding Np to the secondary winding Ns and then appear at the load in the output terminal. The technical characteristic of the present invention is to provide a corresponding current impulse to charge or discharge the equivalent capacitor Cs so that the current $i_{Lr}$ through the resonant inductor Lr is kept constant to decrease the current difference between the current $i_{Lr}$ through the resonant inductor Lr and the current $i_{Lm}$ through the magnetizing inductor Lm.

Figure 2B:
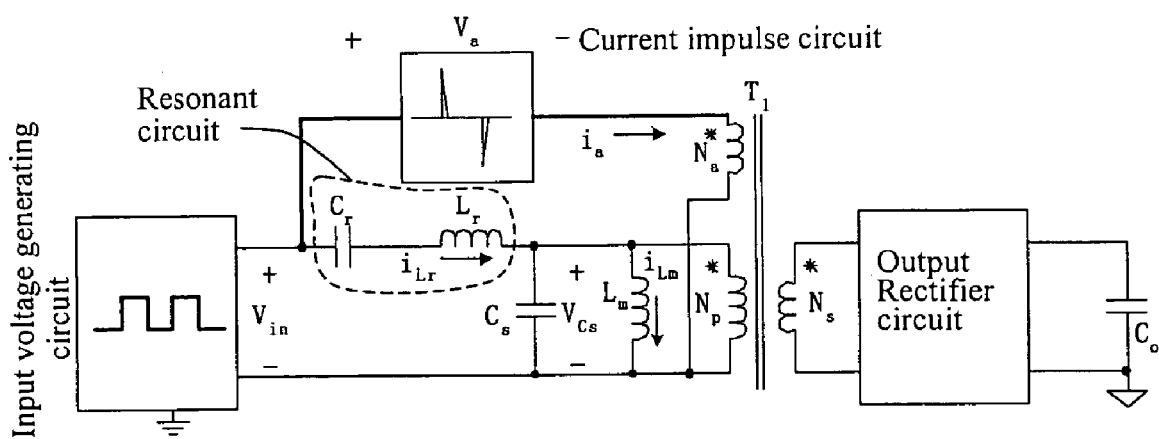

In FIG. 2(a), the resonant inductor Lr, the magnetizing inductor Lm and the transformer T1 are shown separately; nevertheless, they are able to be integrated in the practical manufacturing process. Besides, the other terminal of the current impulse circuit is electrically connected to the resonant inductor Lr, the equivalent capacitor Cs, the magnetizing inductor Lm and the primary winding Np of the transformer T1 as FIG. 2(a) shows. Alternatively, the other terminal of the current impulse circuit is further electrically connected to an auxiliary winding Na of the primary winding Np of the transformer T1 as FIG. 2(b) shows. The non-common polarity terminal of the auxiliary winding Na is electrically connected to the non-common polarity terminal of the primary winding Np of the transformer T1, and the common polarity terminal of the auxiliary winding Na is electrically connected to the current impulse circuit.

Although the resonant capacitor Cr is directly connected to the input voltage generating circuit in FIG. 2(a) or 2(b), the position of the resonant capacitor Cr and that of the resonant inductor Lr are exchangeable. Besides, instead of connecting to the input voltage generating circuit, the whole series resonant circuit is further able to be electrically connected between the transformer T1 and the ground. Moreover, instead of connecting to input voltage generating circuit, the current impulse circuit is further able to be electrically connected to other signal sources, wherein the signal source connected to the current impulse circuit is synchronized with a voltage square-wave generated by the input voltage generating circuit.

Figure 3A:
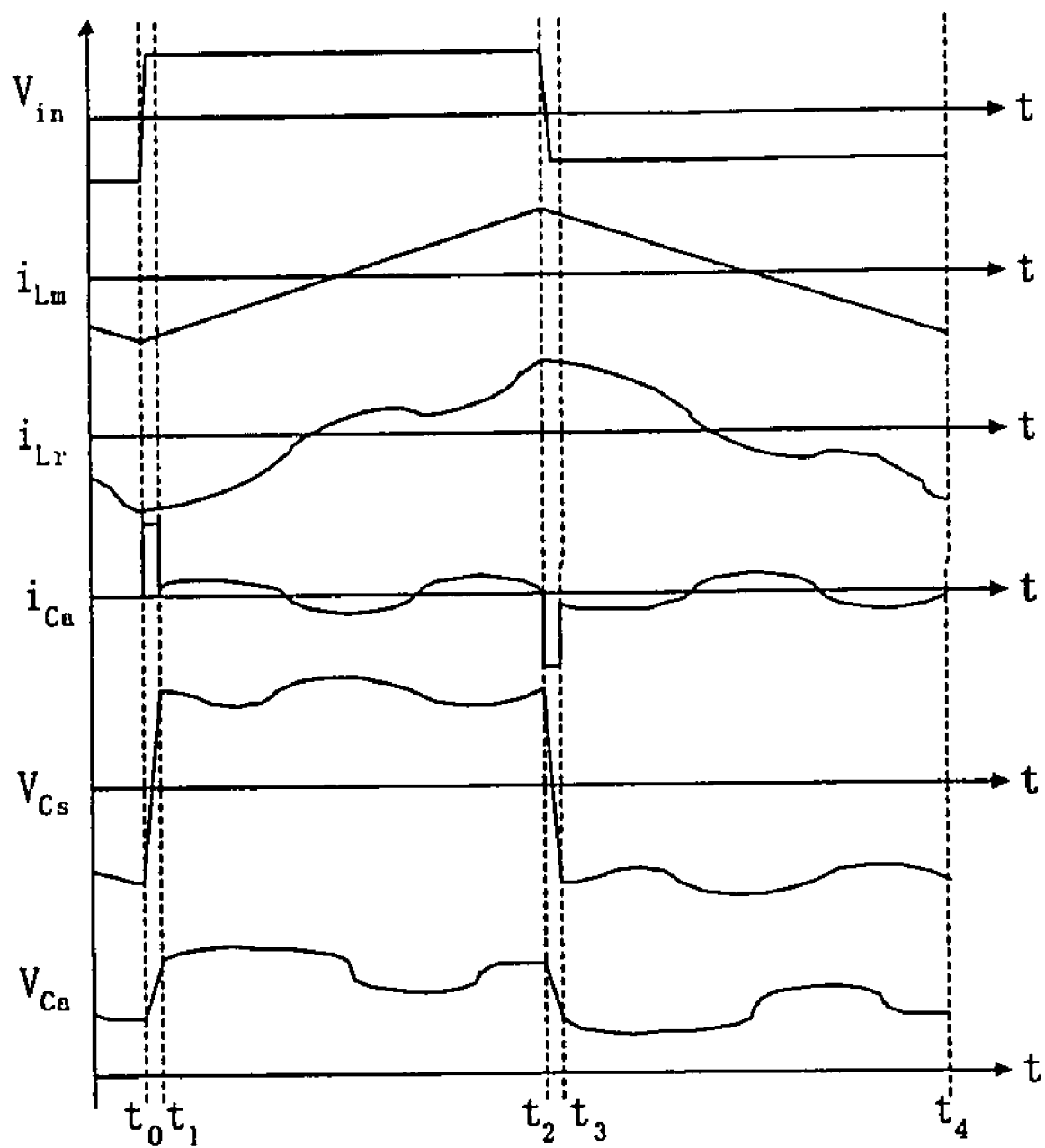
FIG. 3(a) is a main waveform diagram showing a series resonant circuit with no load according to the first embodiment of the present invention.

Please refer to FIG. 3(a), which is a main waveform diagram showing a series resonant circuit with no load according to the first embodiment of the present invention. In FIG. 3(a), Vin is a voltage waveform of the input voltage generating circuit, $i_{Lr}$ is a current waveform of the resonant inductor Lr, $i_{Lm}$ is a current waveform of the magnetizing inductor Lm, $i_{Ca}$ and $v_{Ca}$ are a current waveform and a voltage waveform of the current impulse circuit respectively, and $V_{Cs}$ is a voltage waveform of the equivalent capacitor Cs.

The operation principle of the series resonant circuit shown in FIG. 2 is described as follows by referring to FIG. 3(a). At time $t_0$, the potential of the voltage Vin from the input voltage generating circuit varies from a high level to a low level, and the current impulse circuit provides an extremely narrow and positive current impulse for charging the equivalent capacitor Cs so that a current component from the current $i_{Lr}$ of the resonant inductor Lr for charging the equivalent capacitor Cs is reduced. After the equivalent capacitor Cs is charged, the current difference between the current $i_{Lr}$ of the resonant inductor Lr and the current $i_{Lm}$ of the magnetizing inductor Lm is reduced. Therefore, the power transferred from the primary winding Np to the secondary winding Ns is reduced.

Figure 3B:
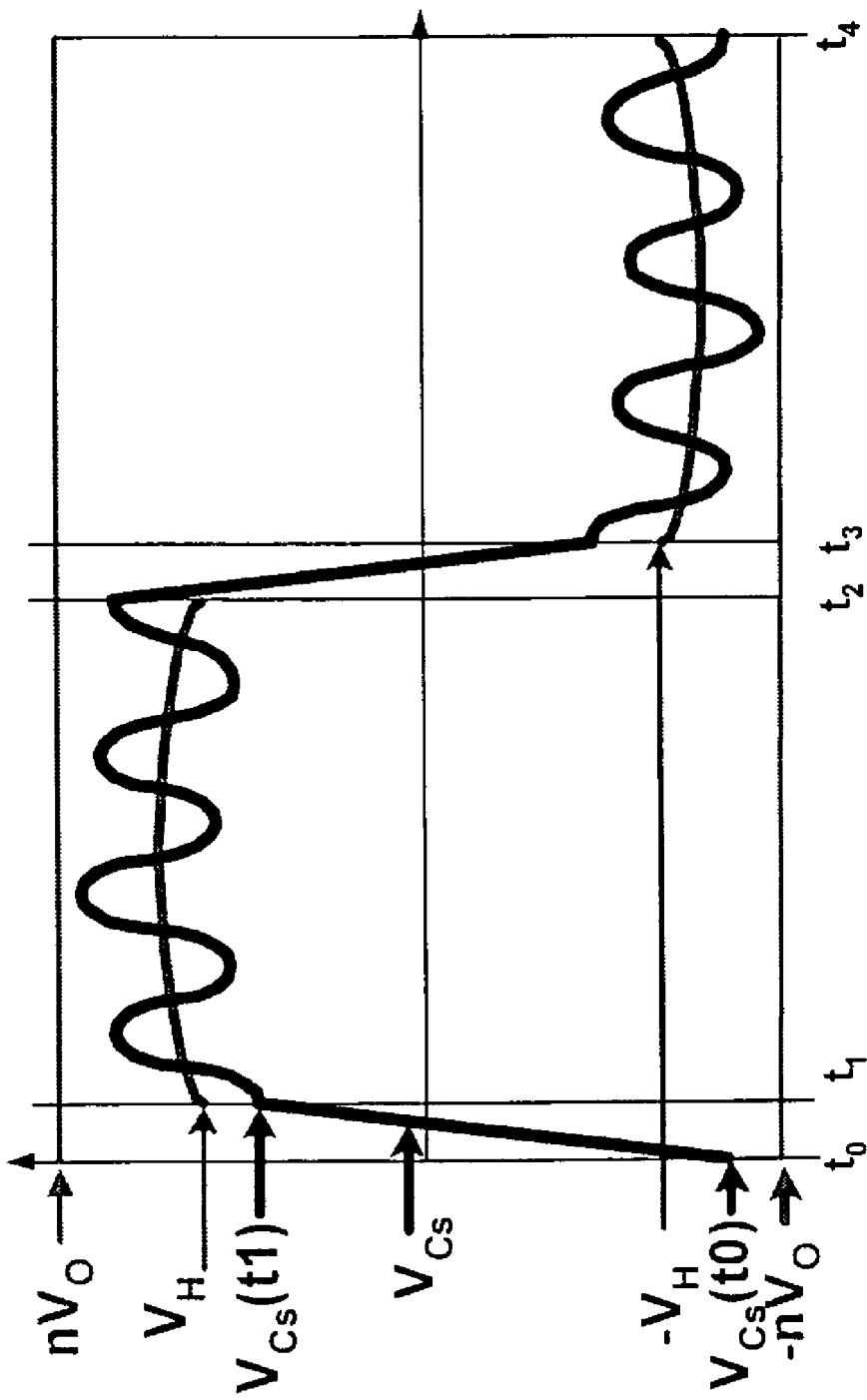
FIG. 3(b) is another waveform diagram showing a series resonant circuit with no load according to the first embodiment of the present invention.

Please refer to FIG. 3(b), which is another waveform diagram showing a series resonant circuit with no load according to the first embodiment of the present invention. In FIG. 3(b), Vo is a terminal voltage across the output capacitor Co shown in FIG. 2, i.e. the output voltage generated by the output rectifier circuit, and n is the winding ratio of the transformer T1.

In FIGS. 2(a) & 2(b), the input voltage Vin of the input voltage generating circuit has two potential levels, i.e. a high potential level and a low potential level. For the input voltage Vin from a half-bridge circuit as the input voltage generating circuit, Vi is the high potential level and 0 is the low potential level. There are a high-frequency component and a low-frequency component in the voltage $V_{Cs}$ of the equivalent capacitor Cs. The frequency f1 of the low-frequency component is an operation frequency, and the frequency f2 of the high-frequency component is almost equal to the resonant frequency generated by the parallel connection of the equivalent capacitor Cs, the resonant inductor Lr and the magnetizing inductor Lm. Generally, the frequency f2 of the high-frequency component is several dozen times of the frequency f1 of the low-frequency component.

When the input voltage generated by the input voltage generating circuit is a high potential level Vi, the low-frequency component of the voltage $V_{Cs}$ across the equivalent capacitor Cs has a corresponding amplitude $V_H$. While the load is zero, the voltage variation across the resonant capacitor Cr is as small as its direct current component Vi/2. The amplitude $V_H$ is approximately a voltage difference between the high potential level Vi and the resonant capacitor Cr, i.e. the voltage component of the dc component Vi/2 distributed to the resonant inductor Lr and the magnetizing inductor Lm. When the input voltage generated by the input voltage generating circuit is zero, the amplitude of the low-frequency component of the voltage $V_{Cs}$ across the equivalent capacitor Cs is $-V_H$. The amplitude $-V_H$ is approximately equal to the voltage across the resonant capacitor Cr, i.e. the voltage component of the dc component −Vi/2 distributed to the resonant inductor Lr and the magnetizing inductor Lm. At this time, there still exits a high-frequency component of the voltage across the equivalent capacitor Cs.

When the input voltage Vin from the input voltage generating circuit varies, for example, during the period of $t_0$-$t_1$ in FIG. 3(b), from zero to a high potential level, an extremely narrow positive current square wave will be generated by the current impulse circuit to charge the equivalent capacitor Cs and raise the potential level of the equivalent capacitor Cs from about $-V_H$ to about $V_H$. The equivalent capacitor Cs therefore obtains a new voltage $V_{Cs}(t_1)$ and participates in the next half cycle of the resonance.

As long as the absolute value of the difference between $V_{Cs}(t_1)$ and $V_H$ is a little bit smaller than that between $V_H$ and nVo, the voltage across the equivalent capacitor Cs will not exceed nVo. The power in the primary winding will not be transferred to the secondary winding and the output voltage is hence stabilized. In other words, the function of the current impulse circuit is to provide a current impulse to charge the equivalent capacitor Cs from about $-V_H$ to about $V_H$ or discharge the equivalent capacitor Cs from about $V_H$ to about $-V_H$ when the input voltage Vin from the input voltage generating circuit varies. The equivalent capacitor Cs is therefore given a new voltage again and the high-frequency resonance amplitude of the equivalent capacitor Cs in every half cycle is reduced.

That is to say, the function of the current impulse circuit of the present invention is to provide a current impulse to charge or discharge the equivalent capacitor Cs when the input voltage Vin from the input voltage generating circuit varies so as to keep the current $i_{Lr}$ through the resonant inductor Lr stable. The advantage of the present invention is that the series resonant circuit with no load in the output terminal has little power transferred from the primary winding Np to the secondary winding Ns. Therefore, the output voltage of the series resonant circuit with even no load is able to be stabilized and the operation frequency variation range of the series resonant circuit is able to be kept small.

Figure 4A:
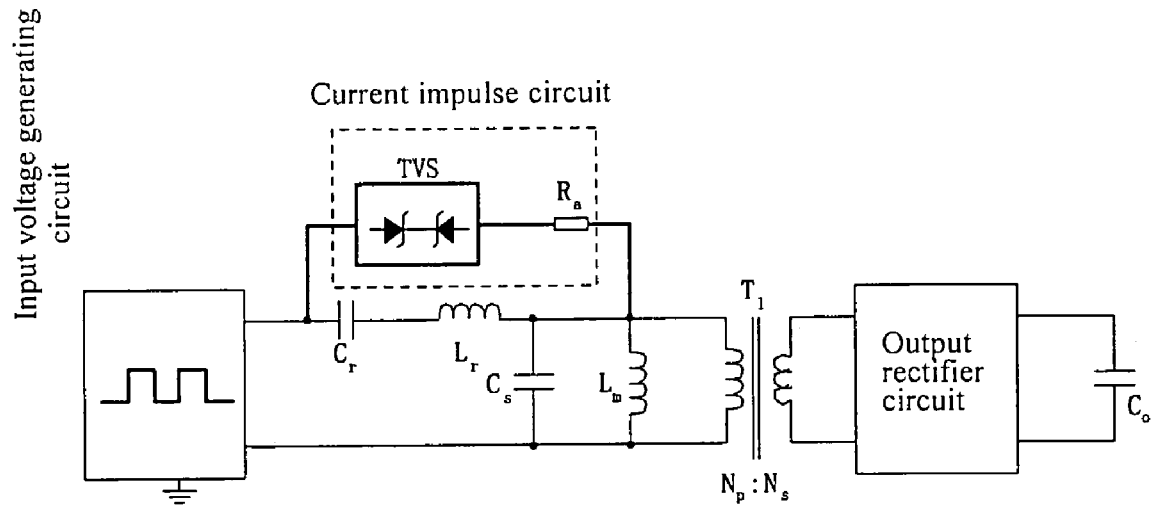
FIGS. 4(a) & 4(b) are circuit diagrams showing a series resonant circuit according to the second embodiment of the present invention.
Figure 4B:
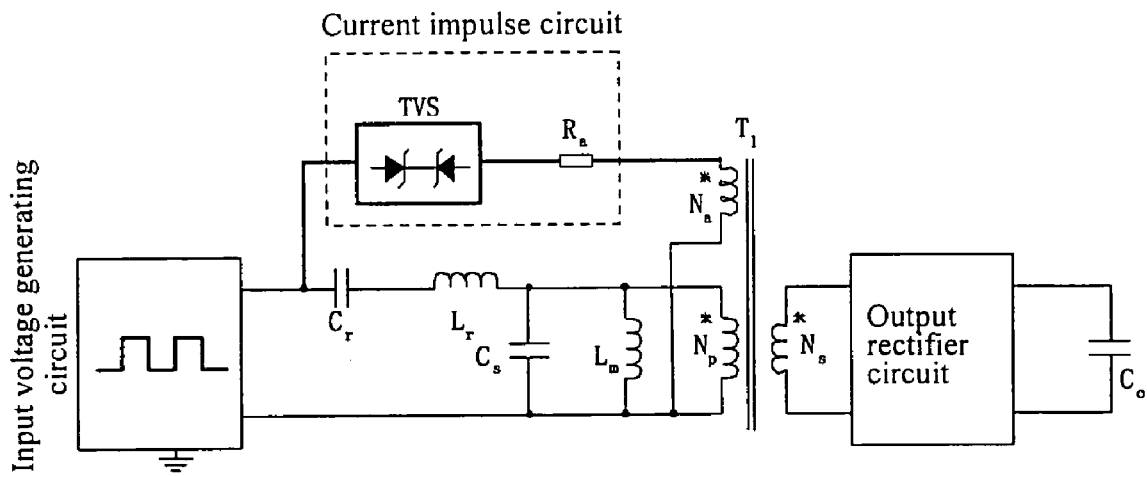

Please refer to FIGS. 4(a) & 4(b), which are circuit diagrams showing a series resonant circuit according to the second embodiment of the present invention. It can be seen from FIG. 4(a) that the current impulse circuit of the present invention is composed of a transient voltage suppressor (TVS) and a resistor Ra, wherein the resistance of the resistor Ra can be zero. In FIG. 4(b), the current impulse circuit composed of the TVS and the resistor Ra is electrically connected to the auxiliary winding Na of the primary winding Np of the transformer T1.

Figure 5:
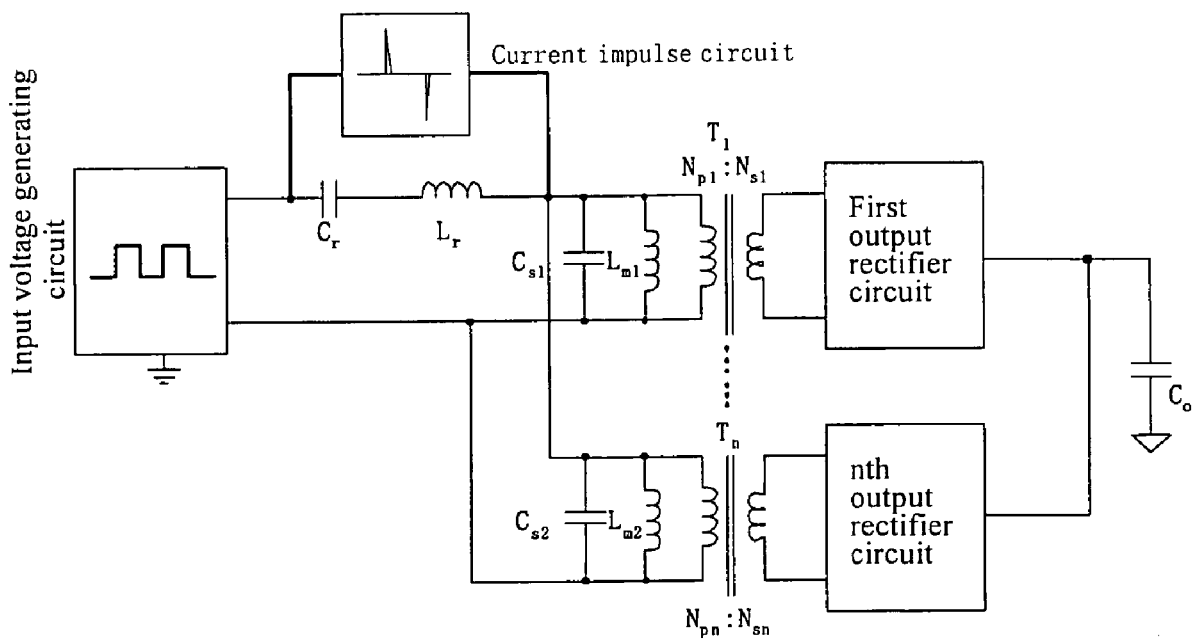
FIG. 5 is a circuit diagram showing a series resonant circuit according to the third embodiment of the present invention.

Moreover, the technical characteristic of the present invention is also applicable to several series resonant circuits connected in parallel. Please refer to FIG. 5, which is a circuit diagram showing a series resonant circuit according to the third embodiment of the present invention. The series resonant circuit shown in FIG. 5 is composed of n series resonant circuits connected in parallel. The equivalent capacitors Cs, the magnetizing inductors Lm, the transformer T1 and the output rectifiers are electrically connected in parallel and the numbers of them are all the same. The operation principle is also to provide a current impulse to each of the equivalent capacitors Cs so as to decrease a respective current difference between the resonant inductor and each of the magnetizing inductors Lm when the input voltage Vin varies.

Figure 6A:
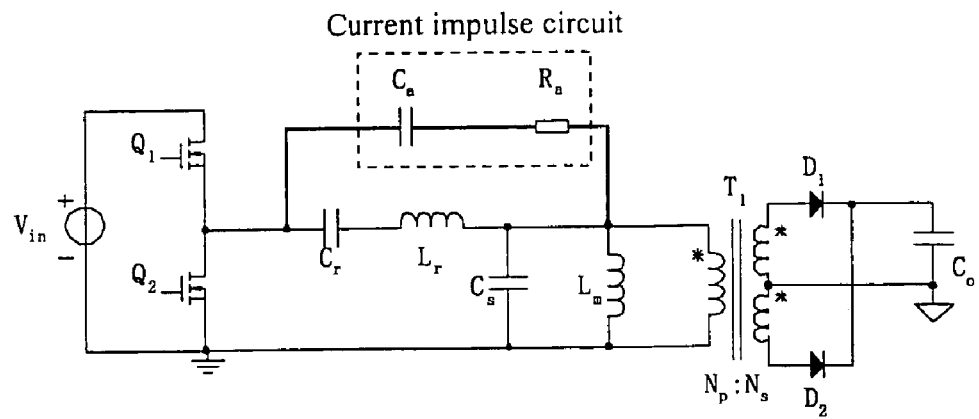
FIGS. 6(a) & 6(b) are circuit diagrams showing a series resonant circuit according to the fourth embodiment of the present invention.
Figure 6B:
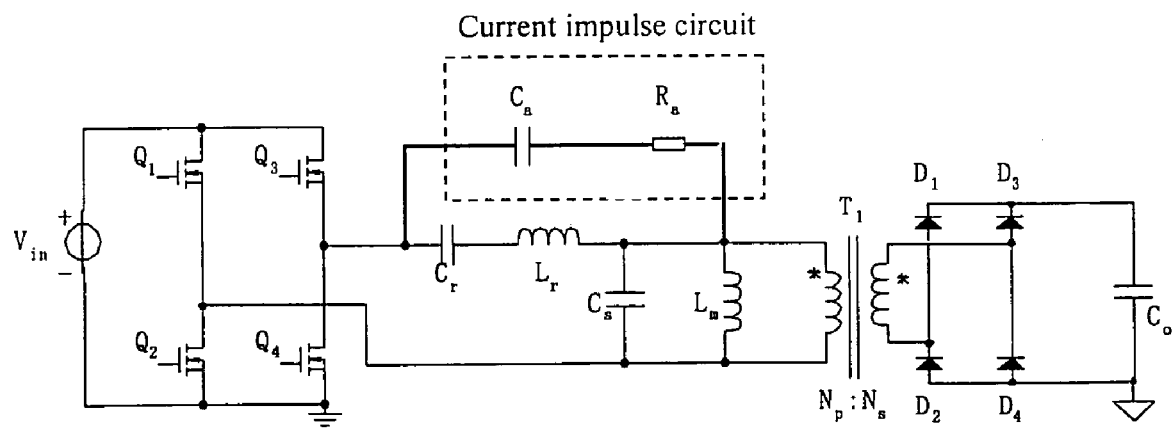

Please refer to FIGS. 6(a) & 6(b), which are circuit diagrams showing a series resonant circuit according to the fourth embodiment of the present invention. The input voltage generating circuit in FIGS. 4(a) & 4(b) can be the half-bridge circuit shown in FIG. 6(a) or the full-bridge circuit shown in FIG. 6(b). The output rectifier circuit can be the full-wave rectifier circuit shown in FIG. 6(a) or the full-bridge rectifier circuit shown in FIG. 6(b). The difference between FIG. 6 and FIG. 4 is that the current impulse circuit is composed of a capacitor Ca and a resistor Ra connected in series, wherein the resistance of the resistor Ra can be zero.

Figure 7A:
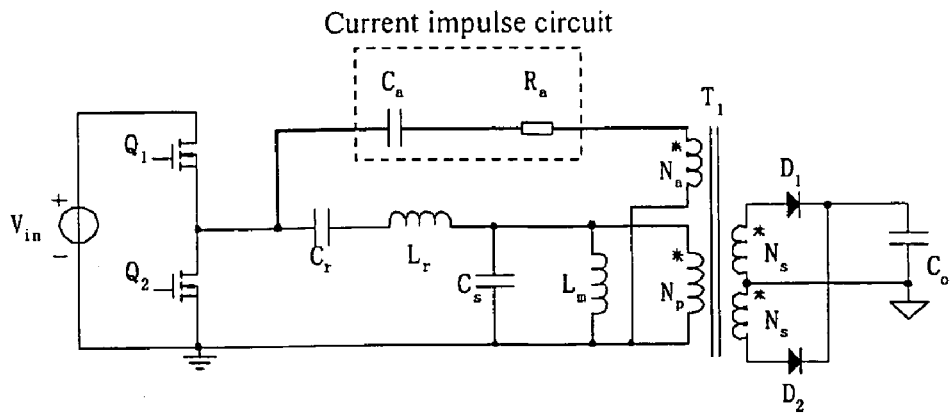
FIGS. 7(a) & 7(b) are circuit diagrams showing a series resonant circuit according to the fifth embodiment of the present invention.
Figure 7B:
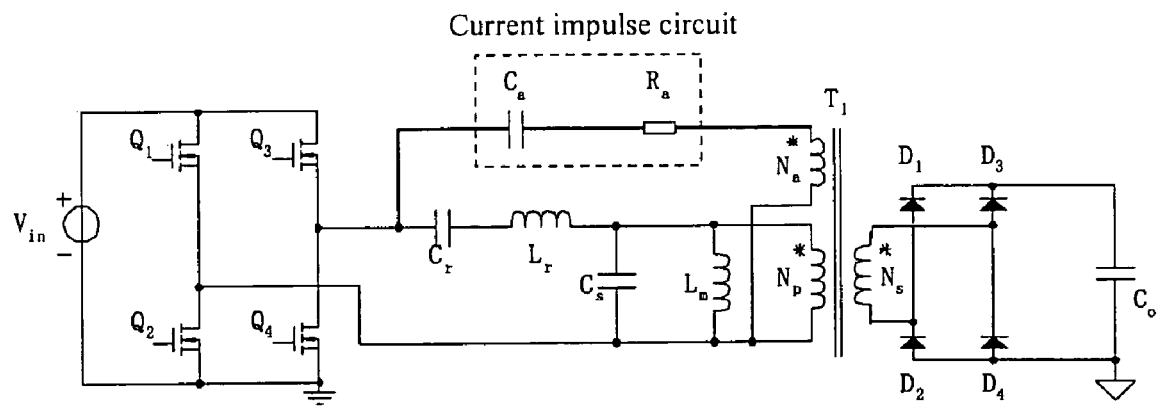

Please refer to FIGS. 7(a) & 7(b), which are circuit diagrams showing a series resonant circuit according to the fifth embodiment of the present invention. The difference between FIG. 7 and FIG. 6 is that the current impulse circuit composed of the capacitor Ca and the resistor Ra is electrically connected to the auxiliary winding Na of the primary winding Np of the transformer Tl.

Figure 8:
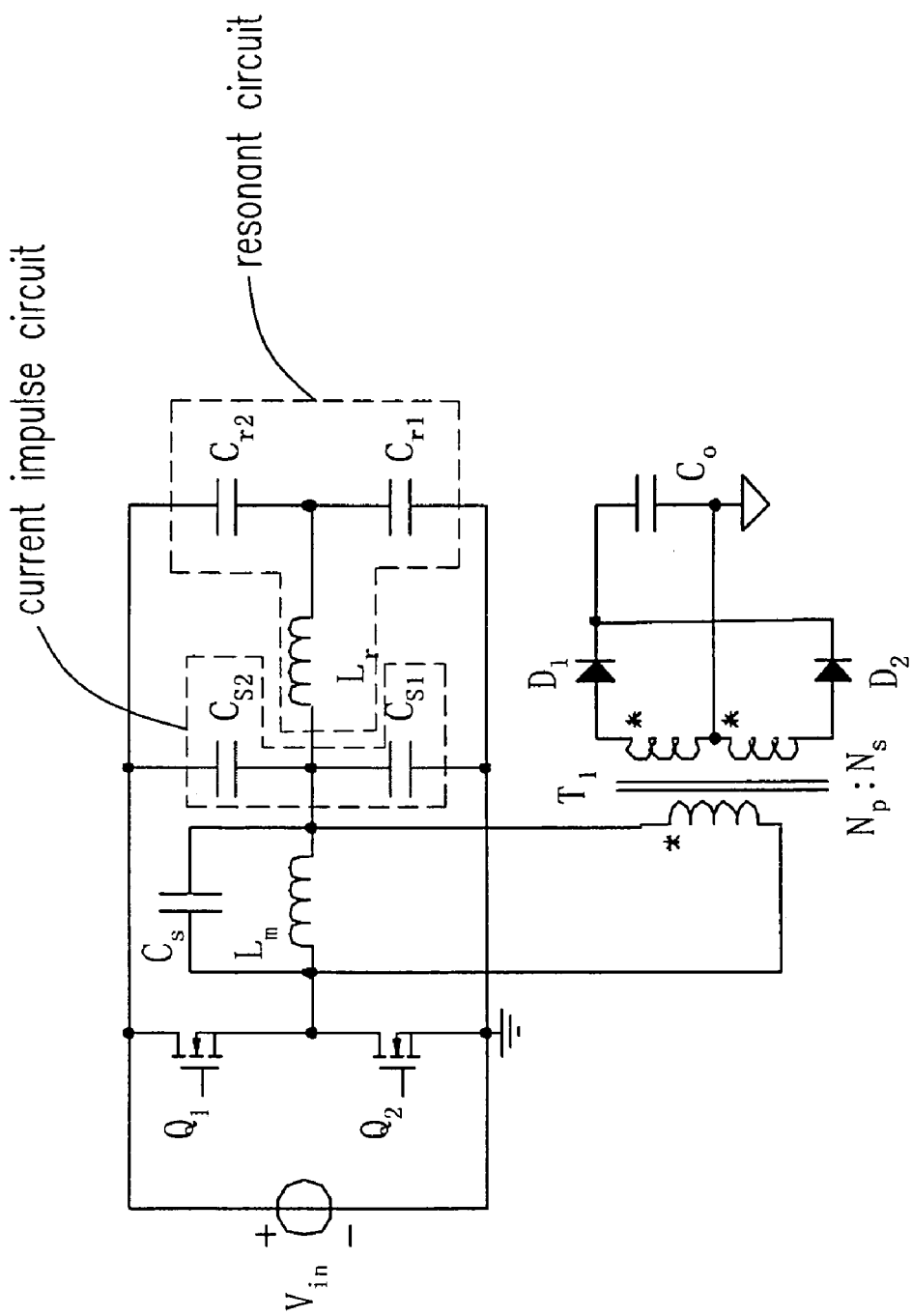
FIG. 8 is a circuit diagram showing a series resonant circuit according to the sixth embodiment of the present invention.

Please refer to FIG. 8, which is a circuit diagram showing a series resonant circuit according to the sixth embodiment of the present invention. The difference between FIG. 8 and the aforementioned embodiments is that the resonant circuit is composed of two resonant capacitors Cr1 & Cr2 and a resonant inductor Lr. Besides, instead of the two capacitors Cs1 & Cs2, one of them is still able to constitute the current impulse circuit.

In conclusion, the main object of the present invention is to provide a series resonant circuit and a control method thereof. Under the situation of no dummy load, the conventional series resonant circuit is able to be operated smoothly with no load by all kinds of the auxiliary circuits including capacitors, resistors and a TVS according to the present invention. Besides, the operation frequency variation of the system is narrower.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A series resonant circuit device, comprising:
   a resonant circuit having at least a resonant capacitor and a resonant inductor;
   an equivalent capacitor electrically coupled to said resonant circuit;
   a magnetizing inductor electrically connected to said equivalent capacitor in parallel;
   a transformer having a primary winding electrically connected to said magnetizing inductor in parallel; and
   a current impulse circuit electrically coupled to said resonant circuit and synchronized with an input voltage of said series resonant circuit device for providing a current impulse to said equivalent capacitor so as to decrease a current difference between said resonant inductor and said magnetizing inductor when said input voltage varies.

2. The series resonant circuit device as claimed in claim 1, wherein the capacitance of said equivalent capacitor is one from the capacitance of a junction capacitor in an output terminal of said series resonant circuit device and the capacitance of a parasitic capacitor of said transformer which are converted to said primary winding of said transformer.

3. The series resonant circuit device as claimed in claim 1, wherein one terminal of said current impulse circuit is electrically connected to one terminal of said resonant circuit and said input voltage, and the other terminal of said current impulse circuit is electrically connected to said primary winding of said transformer, said magnetizing inductor, said equivalent capacitor and the other terminal of said resonant circuit.

4. The series resonant circuit device as claimed in claim 1, wherein said primary winding of said transformer further comprises an auxiliary winding, said current impulse circuit is electrically coupled to said resonant circuit through said auxiliary winding, one terminal of said current impulse circuit is electrically connected to said resonant circuit and said input voltage, and the other terminal of said current impulse circuit is electrically connected to said auxiliary winding.

5. The series resonant circuit device as claimed in claim 1, wherein said current impulse circuit includes at least a capacitor and a resistor.

6. The series resonant circuit device as claimed in claim 1, wherein said current impulse circuit includes at least a transient voltage suppressor (TVS) and a resistor.

7. The series resonant circuit device as claimed in claim 1, wherein a secondary winding of said transformer is electrically coupled to an output rectifier circuit for providing an output voltage, and said output rectifier circuit is one selected from the group of a full-wave rectifier circuit and a full-bridge rectifier circuit.

8. The series resonant circuit device as claimed in claim 1 further comprising an input—voltage generating circuit for generating said input voltage, wherein said input-voltage generating circuit is one of a half-bridge circuit and a full-bridge circuit.

9. A voltage stabilizing method for a series resonant circuit device with zero load, wherein said series resonant circuit device comprises a resonant circuit, a equivalent capacitor, a magnetizing inductor and a transformer, said resonant circuit has at least a resonant capacitor and a resonant inductor, said equivalent capacitor and said magnetizing inductor are electrically connected in parallel and then electrically coupled to said resonant circuit and a primary winding of said transformer is electrically connected to said magnetizing inductor in parallel, comprising steps of:
   providing an input voltage to said series resonant circuit device; and
   providing a current impulse to said equivalent capacitor so as to decrease a current difference between said resonant inductor and said magnetizing inductor when said input voltage varies.

10. The voltage stabilizing method for a series resonant circuit device with zero load as claimed in claim 9, wherein the capacitance of said equivalent capacitor is one from the capacitance of a junction capacitor in an output terminal of said series resonant circuit device and the capacitance of a parasitic capacitor of said transformer which are converted to said primary winding of said transformer, said input voltage is provided by one of a half-bridge circuit and a full-bridge circuit, and said current impulse is provided by one of a capacitor and a transient voltage suppressor (TVS).

11. A voltage stabilizing method for a series resonant circuit device with zero load, wherein said series resonant circuit device comprises a resonant circuit, at least two equivalent capacitors, at least two magnetizing inductors and at least two transformers, said resonant circuit has at least a resonant capacitor and a resonant inductor, all said equivalent capacitors and said magnetizing inductors are electrically connected in parallel and then electrically coupled to said resonant circuit, and a primary winding of each of said transformers is electrically connected to each of said magnetizing inductors in parallel, comprising steps of:
   providing an input voltage to said series resonant circuit device; and providing a current impulse to each of said equivalent capacitors so as to decrease a respective current difference between said resonant inductor and each of said magnetizing inductors when said input voltage varies.

12. The voltage stabilizing method for a series resonant circuit device with zero load as claimed in claim 11, wherein the capacitance of each said equivalent capacitor is one from the capacitance of a junction capacitor in an output terminal of said series resonant circuit device and the capacitance of a parasitic capacitor of each said transformer which are converted to said primary winding of said transformer, said input voltage is provided by one of a half-bridge circuit and a full-bridge circuit, and said current impulse is provided by one of a capacitor and a transient voltage suppressor (TVS).

13. The voltage stabilizing method for a series resonant circuit device with zero load as claimed in claim 11, wherein the number of said equivalent capacitors, said magnetizing inductors and said transformers are the same.

14. A voltage stabilizing method for a series resonant circuit device with zero load, wherein said series resonant circuit device comprises a resonant circuit, a equivalent capacitor, a magnetizing inductor and a transformer, said resonant circuit has at least a resonant capacitor and a resonant inductor, said equivalent capacitor and said magnetizing inductor are electrically connected in parallel and then electrically coupled to said resonant circuit, and a primary winding of said transformer is electrically connected to said magnetizing inductor in parallel, comprising steps of:
    providing an input voltage to said series resonant circuit device; and
    charging and discharging said equivalent capacitor so as to decrease a current difference between said resonant inductor and said magnetizing inductor when said input voltage varies.

15. The voltage stabilizing method for a series resonant circuit device with zero load as claimed in claim 14, wherein the capacitance of said equivalent capacitor is one from the capacitance of a junction capacitor in an output terminal of said series resonant circuit device and the capacitance of a parasitic capacitor of said transformer which are converted to said primary winding of said transformer, and said input voltage is provided by one of a half-bridge circuit and a full-bridge circuit.

16. The voltage stabilizing method for a series resonant circuit device with zero load as claimed in claim 14, wherein said equivalent capacitor is charged and discharged by one of a capacitor and a transient voltage suppressor (TVS).

17. A voltage stabilizing method for a series resonant circuit device with zero load, wherein said series resonant circuit device comprises a resonant circuit, at least two equivalent capacitors, at least two magnetizing inductors and at least two transformers, said resonant circuit has at least a resonant capacitor and a resonant inductor, all said equivalent capacitors and said magnetizing inductors are electrically connected in parallel and then electrically coupled to said resonant circuit, and a primary winding of each of said transformers is electrically connected to each of said magnetizing inductors in parallel, comprising steps of:
    providing an input voltage to said series resonant circuit device; and
    charging and discharging each of said equivalent capacitors so as to decrease a current difference between said resonant inductor and each of said magnetizing inductors when said input voltage varies.

18. The voltage stabilizing method for a series resonant circuit device with zero load as claimed in claim 17, wherein the capacitance of each said equivalent capacitor is one from the capacitance of a junction capacitor in an output terminal of said series resonant circuit device and the capacitance of a parasitic capacitor of each said transformer which are converted to said primary winding of said transformer, and said input voltage is provided by one of a half-bridge circuit and a full-bridge circuit.

19. The voltage stabilizing method for a series resonant circuit device with zero load as claimed in claim 17, wherein the numbers of said equivalent capacitors, said magnetizing inductors and said transformers are the same.

20. The voltage stabilizing method for a series resonant circuit device with zero load as claimed in claim 17, wherein each of said equivalent capacitors is charged and discharged by one of a capacitor and a transient voltage suppressor (TVS).

* * * * *